United States Patent
Borapura et al.

(10) Patent No.: US 12,544,836 B2
(45) Date of Patent: Feb. 10, 2026

(54) GROOVING TOOL WITH BRAZED CARBIDE TOP CLAMP

(71) Applicant: Kennametal India Limited, Karnataka (IN)

(72) Inventors: Santhosha Borapura, Karnataka (IN); Padmakumar Muthuswamy, Karnataka (IN)

(73) Assignee: KENNAMETAL INDIA LTD., Bangalore (IN)

( * ) Notice: Subject to any disclaimer, the term of this patent is extended or adjusted under 35 U.S.C. 154(b) by 476 days.

(21) Appl. No.: 18/173,486

(22) Filed: Feb. 23, 2023

(65) Prior Publication Data

US 2023/0271258 A1 Aug. 31, 2023

(30) Foreign Application Priority Data

Feb. 25, 2022 (IN) .............................. 202241010111

(51) Int. Cl.
*B23B 27/04* (2006.01)
*B23B 27/18* (2006.01)

(52) U.S. Cl.
CPC .............. *B23B 27/04* (2013.01); *B23B 27/18* (2013.01); *B23B 2222/28* (2013.01); *B23B 2240/08* (2013.01)

(58) Field of Classification Search
CPC ..... B23B 27/04; B23B 27/18; B23B 27/1625; B23B 2240/08; B23B 2222/28; B23B 2222/76; B23B 2222/84
See application file for complete search history.

(56) References Cited

U.S. PATENT DOCUMENTS

| | | | | |
|---|---|---|---|---|
| 146,680 | A | * 1/1874 | Husbands, Jr. | ........ B28D 1/122 83/843 |
| 195,699 | A | * 10/1877 | Burger | .................. B23D 61/06 83/843 |
| 2,846,756 | A | 8/1958 | Novkov | |
| 3,518,737 | A | * 7/1970 | Hood | .................... B23B 27/045 D15/139 |
| 3,534,457 | A | 10/1970 | Mueller | |
| 3,551,975 | A | * 1/1971 | Novkov | .................. B23B 27/04 407/117 |
| 3,557,417 | A | * 1/1971 | Kollar | .................... B23B 27/04 407/112 |
| 3,577,618 | A | * 5/1971 | Cashman | ................ B23B 27/00 407/104 |
| 3,693,224 | A | * 9/1972 | Bartoszevicz | .......... B23B 27/04 407/111 |

(Continued)

FOREIGN PATENT DOCUMENTS

| | | | | |
|---|---|---|---|---|
| CN | 109014259 A | * 12/2018 | ............. B23B 27/18 |
| GB | 1369096 | 10/1974 | |
| GB | 2140718 | 12/1984 | |

*Primary Examiner* — Sara Addisu
(74) *Attorney, Agent, or Firm* — Christopher J. Owens (57) ABSTRACT

A tool is provided having a tool holder and a brazed top clamp positioned in a portion of the tool holder. The brazed top clamp is made of a material that has a hardness that is greater than the material that makes up the tool holder. In certain embodiments, the tool holder has a slot that is in the shape of a "T-slot" and the top clamp is in the shape of a "T shaped rail" that is positioned within the "T-slot" of the tool holder.

17 Claims, 8 Drawing Sheets

(56) References Cited

U.S. PATENT DOCUMENTS

| | | | | |
|---|---|---|---|---|
| 3,731,356 | A * | 5/1973 | Gowanlock | B23B 27/1677 407/107 |
| 3,754,309 | A * | 8/1973 | Jones | B23B 27/164 407/77 |
| 3,934,320 | A | 1/1976 | Mccreery | |
| 3,986,237 | A * | 10/1976 | Hertel | B23B 27/16 407/107 |
| 4,001,925 | A * | 1/1977 | Eriksson | B23B 27/045 407/107 |
| 4,010,526 | A | 3/1977 | Shephard | |
| 4,011,050 | A * | 3/1977 | Zinner | B23B 27/045 407/92 |
| 4,050,127 | A * | 9/1977 | Bodem | B23B 27/1611 407/107 |
| 4,077,735 | A * | 3/1978 | Dick | B23B 27/04 407/89 |
| 4,169,690 | A * | 10/1979 | Kendra | B23B 27/1625 407/111 |
| 4,414,870 | A * | 11/1983 | Peterson, Jr. | B23B 27/06 82/158 |
| 4,509,886 | A * | 4/1985 | Lindsay | B23B 27/04 407/107 |
| 4,674,371 | A * | 6/1987 | Smolders | B23B 27/04 82/158 |
| 5,088,862 | A * | 2/1992 | Niebauer | B23B 27/045 407/120 |
| 5,100,269 | A * | 3/1992 | Lyon | B23B 27/06 407/107 |
| 5,133,394 | A * | 7/1992 | Landtwing | B27G 13/04 144/241 |
| 5,207,724 | A * | 5/1993 | Shouse | B23B 27/04 407/112 |
| 5,993,118 | A | 11/1999 | Brask et al. | |
| 6,299,389 | B1 | 10/2001 | Barazani | |
| 6,702,529 | B1 | 3/2004 | Tagtstrom et al. | |
| 6,758,638 | B1 * | 7/2004 | Mihic | B23B 27/04 407/111 |
| 6,969,218 | B2 * | 11/2005 | Lach | B23B 27/1629 407/115 |
| 7,261,496 | B2 * | 8/2007 | Zitzlaff | B25B 5/10 407/107 |
| 8,381,625 | B2 * | 2/2013 | Lizzi | B27B 33/12 83/835 |
| 10,821,528 | B2 * | 11/2020 | Hollfelder | B23B 51/00 |
| 2005/0232712 | A1 * | 10/2005 | Hecht | B23C 5/22 407/117 |
| 2011/0293382 | A1 * | 12/2011 | Chistyakov | B23B 29/24 407/101 |
| 2013/0129437 | A1 | 5/2013 | Sevdic et al. | |
| 2014/0234040 | A1 * | 8/2014 | Hecht | B23B 27/04 407/107 |
| 2014/0321929 | A1 * | 10/2014 | Bhagath | B23B 27/045 407/115 |
| 2015/0183029 | A1 * | 7/2015 | Makhlin | B23B 29/24 407/69 |
| 2017/0136549 | A1 * | 5/2017 | Athad | B23B 27/145 |
| 2017/0282255 | A1 * | 10/2017 | Luik | B23B 27/08 |
| 2023/0121524 | A1 * | 4/2023 | Hecht | B23B 27/04 407/66 |

* cited by examiner

GROOVING TOOL WITH BRAZED CARBIDE TOP CLAMP

CROSS-REFERENCE TO RELATED APPLICATION

This utility non-provisional patent application claims the benefit of priority to India Patent Application Serial No. 202241010111, filed Feb. 25, 2022. The entire contents of Indian Patent Application Serial No. 202241010111 is incorporated by reference onto this utility non-provisional patent application as if fully rewritten herein.

STATEMENT REGARDING FEDERALLY SPONSORED RESEARCH OR DEVELOPMENT

Not Applicable.

BACKGROUND OF THE INVENTION

1. Field of the Invention

The present invention relates to a tool having a tool holder and a brazed top clamp that is positioned within at least a portion of the tool holder. In certain embodiments of this invention, the tool may be a grooving tool and a cutting tool.

2. Description of the Background Art

The background art discloses technology such as a grooving and cut off tool having a bar-like tool holder having a lateral recess in which a flat blade-like support element is seated and firmly attached to the holder. Other background art discloses a tool for grooving having a holder, a clamp, and a metal-cutting insert.

Those persons of ordinary skill in the art understand that a top clamp of a grooving tool holder wears faster in deep grooving and low-pressure coolant applications due to continuous chip flow over the clamp. The background art has failed to address this problem in the industry. The present invention improves the wear resistance by using a modular top clamp that is bonded to a tool holder wherein the modular top clamp is preferably made of a material that has a hardness that is greater than the hardness of the material that makes up the tool holder.

SUMMARY OF THE INVENTION

A tool is provided having a tool holder and a brazed top clamp that is positioned within at least a portion of the tool holder.

In one embodiment of this invention a tool is provided comprising a tool holder having a body, wherein the body has a slot wherein the slot has (a) a top, wherein the top has an open end, and (b) an open front side; and a modular top clamp that has a first end, a second end opposite the first end, and a middle section disposed between the first end and the second end; and a joining spacing; wherein the first end of the modular top clamp is positioned within the slot of the body of the tool holder wherein the joining spacing is located between at least a portion of the first end of the modular top clamp and at least a portion of the slot of the body of the tool holder. In certain embodiments of this invention the tool includes wherein the joining spacing is a braze spacing wherein the braze spacing is filled with a brazing material for bonding at least a portion of the first end of the modular top clamp to at least a portion of the slot of the body of the tool holder. In other embodiments of this invention, the modular top clamp is made of a material having a hardness that is greater than a hardness of a material that makes up the tool holder. For example, but limited to, the modular top clamp is made of hardened steel and the tool holder is made of steel. In certain embodiments of the tool of this invention, the modular top clamp is made of carbide.

In certain embodiments of the tool of this invention, as described herein, the tool includes a cutting body having a cutting insert.

In certain embodiments of this invention, the tool is a grooving tool.

In certain embodiments of this invention, the tool includes wherein the modular top clamp is in the shape of a "T" rail and wherein the slot of the body of the tool holder is in the shape of a "T" slot.

In certain embodiments of this invention, the tool includes wherein the modular top clamp is in the form of a rectangular rail and wherein the slot of the body of the tool holder is in the form of a rectangular slot.

In certain embodiments of this invention, the tool includes wherein the modular top clamp is made of carbide.

In another embodiment of this invention, a tool is provided comprising a tool holder having a body, wherein said body has a slot, wherein the slot has (a) a top wherein the top has an open end, and (b) an open front side that is perpendicular to the top of the slot, wherein the open front side of the slot is framed by a front face, a left side wall, a right side wall wherein the right side wall is opposite to the left side wall, a back wall that is opposite to the open front side of the slot, and a floor that is opposite to the open end of the top of the slot, wherein the open front side of the slot, the left side wall of the slot, the right side wall of the slot, and the back wall of the slot form an open channel that extends in a longitudinal direction below the open end of the top of the slot of the body to the floor of the slot, and wherein the open channel is in communication with the open end of the top and the open front side of the slot; and a modular top clamp that has a first end, a second end, and a middle section that is disposed between said first end and said second end of said modular top clamp, and wherein said first end of said modular top clamp is positioned within said open front side of said slot and said open channel of said slot; and a joining spacing disposed between at least a portion of said first end of said modular top clamp and a portion of said slot of said body. This tool may further include a cutting body having a cutting insert. In certain embodiments of this tool, at least a portion of said first end of said first end of said modular top clamp and at least a portion of said slot of said body are bonded to fix said modular top clamp to said body of said tool holder, wherein said bonding occurs within at least a portion of said joining spacing. In certain embodiments of this invention the bonding is a brazing of at least a portion of said first end of said modular top clamp to fix at least a portion of said first end of said modular top clamp to at least a portion of said body of said tool holder. In certain embodiments of this invention, at least a portion of the first end of the modular top clamp is brazed to fix at least a portion of the first end of the modular top clamp to at least a portion of the body of the tool holder along one or more of the top of the slot, the left side wall of the slot, the right side wall of the slot, the back wall of the slot, the floor of the slot, and the face of the open front side of the body, with a braze material filling in the joining spacing to form a bonding layer. In certain embodiments of this tool, the modular top clamp is in the shape of a "T" rail and wherein the slot of the body of the tool holder is in the shape of a "T" slot. In certain alternate embodiments of this tool, the modular top clamp is in the form of a rectangular rail and wherein the slot of the body of the tool holder is in the form of a rectangular slot. It will be understood by those persons of ordinary skill in the art that the slot of this invention may be in any geometric shape that accommodates the mating of the tool holder and the modular top clamp.

These and other embodiments of this invention shall be described in more detail herein and in the drawings that show certain embodiments of this invention.

BRIEF DESCRIPTION OF THE DRAWINGS

While various embodiments of this invention are illustrated in the drawings, the particular embodiments shown should not be construed to limit the claims. Various modifications and changes may be made without departing from the scope of the invention.

DETAILED DESCRIPTION OF THE INVENTION

As used herein, the term "hardened material" refers to a material that has a hardness that is greater than another material, for example a "hardened material" may be, for example, but not limited to, a hardened steel, carbide, or a ceramic material.

FIGS. 3-4, 5-6, and 10-11 show certain embodiments of the tool (1) of this invention comprising a tool holder (10) and a brazed top clamp (30) positioned within at least a portion of the tool holder (10).

In reference to FIGS. 1-6, 10, and 11, show a tool (1) of this invention, comprising a tool holder (10) having a body (12), wherein the body (12) has a slot (14) wherein the slot (14) has (a) a top (16) wherein the top (16) has an open end (18), and (b) an open front side (20); and a modular top clamp (30) that has a first end (32), a second end (34) opposite the first end (32), and a middle section (36) disposed between the first end (32) and the second end (34); and a joining spacing (70); wherein the first end (32) of the modular top clamp (30) is positioned within the slot (14) of the body (12) of the tool holder (10) wherein the joining spacing (70) is located between at least a portion of the first end (32) of the modular top clamp (30) and at least a portion of the slot (14) of the body (12) of the tool holder (10). In certain embodiments of this invention the tool includes wherein the joining spacing (70) is a brazing spacing wherein the brazing spacing is filled with a brazing material for bonding at least a portion of the first end (32) of the modular top clamp (30) to at least a portion of the slot (14) of the body (12) of the tool holder (10). In other embodiments of this invention, the modular top clamp (30) is made of a material having a hardness that is greater than a hardness of a material that makes up the tool holder (10). For example, but limited to, the modular top clamp (30) is made of a hardened material such as for example but not limited to a hardened steel and the tool holder (10) is made of steel. In certain embodiments of the tool (1) of this invention, the modular top clamp (30) is made of carbide. In certain embodiments of the tool (1) of this invention, as described herein, the tool (1) includes a cutting body (3) having a cutting insert (5). In certain embodiments of this invention, the tool (1) is a grooving tool. In certain embodiments of this invention the tool (1) is a cutting tool or a cut-up tool. In certain embodiments of this invention, the tool (1) includes wherein the modular top clamp (30) is in the shape of a "T" rail (52) and wherein the slot (14) of the body (12) of the tool holder (10) is in the shape of a "T" slot (50)—see FIGS. 1-9, and FIGS. 15-18. In certain embodiments of this invention, the tool includes wherein the modular top clamp (30) is in the form of a rectangular rail and wherein the slot (14) of the body (12) of the tool holder (10) is in the form of a rectangular slot—see FIGS. 10-14.

It will be understood by those persons of ordinary skill in the art that the slot (14) of the tool holder (10) of this invention may be in any geometric shape that accommodates the mating of the tool holder (10) and the modular top clamp (30).

The brazing material that fills the brazing spacing may be made of any suitable conventional material, such as for example but not limited to a silver based alloy and the like. The brazing material forms a bonding layer between the tool holder (10) and the modular top clamp (30). Any conventional method of brazing may be used, such as for example but not limited to, induction brazing, furnace brazing, and the like.

In certain embodiments of this invention, the bonding between the tool holder (10) and the modular top clamp (30) may be any suitable method of bonding known to those persons of ordinary skill in the art, such as for example but not limited to, brazing, adhesives, and mechanical fasteners, or the like, to fixedly secure the modular top clamp (30) to the tool holder (10).

In certain embodiments of this invention, the tool (1) includes wherein the modular top clamp (30) is made of carbide.

In certain embodiments of this invention, FIGS. 1-6, 10, 11, and 15-18 show a tool (1) comprising a tool holder (10) having a body (12), wherein the body has a slot (14), wherein said slot (14) has (a) a top (16) wherein the slot (16) has an open end (18), and (b) an open front side (20) that is perpendicular to said top (16) of the slot (14), wherein said open front side (20) of the slot (14) is framed by a front face (21), a left side wall (26), a right side wall (28) that is opposite to said left side wall (26), a back wall (29) that is opposite to said open front side (20), and a floor (24) that is opposite to said open end (18) of said top (16), wherein said open front side (20), said left side wall (26), said right side wall (28), and said back wall (29) form an open channel (22) that extends in a longitudinal direction below said open end (18) of said top (16) of said slot (14) of said body (12) to said floor (24) of said slot (14), and wherein said open channel (22) is in communication with said open end (18) of said top (16) and said open front side (20) of said slot (14); and a modular top clamp (30) that has a first end (32), a second end (34), and a middle section (36) that is disposed between said first end (32) and said second end (34) of said modular top clamp (30), and wherein said first end (32) of said modular top clamp (30) is positioned within said open front side (20) of said slot (14) and said open channel (22) of said slot (14). In certain embodiments of this invention, the modular top clamp (30) is removably attached to the body (12) of the tool holder (10). In certain other embodiments of this invention, there is a joining space (70) between the first end (32) of the modular top clamp (30) and the slot (14) of the body (12) wherein the first end (32) of the modular top clamp (30) and the slot (14) of the body (12) are brazed to fix the modular top clamp (30) to the body (12) of the tool holder (10). In certain embodiments of this invention, the first end (32) of the modular top clamp (30) is brazed to fix the modular top clamp (30) to the body (12) of the tool holder (10) along one or more of the top (16) of the slot (14), the left side wall (26), the right side wall (28), the back wall (29), the floor (24), and the face (21) of the open front side (20) of the body (12), with a braze material filling a joining spacing (70) to form a bonding layer. In accordance with an embodiment of the present invention, any suitable conventional method of brazing and braze material may be used, e.g., induction brazing, furnace brazing and the like. The braze material may be made of any suitable conventional material, such as silver-based alloys and the like.

In certain embodiments of this invention, the tool (1) of this invention, as described herein, has a cutting body (3) having a cutting insert (5). In certain embodiments of this invention, the tool (1) is a grooving tool. In certain other embodiments of this invention, the tool is a cutting tool or a cut-up tool.

As shown in FIGS. 3, 4, 5, 6, 10, and 11, the slot (14) of the body (12) of the tool holder (10) and the modular top clamp (30) have complementary features to selectively position and align the first end (32) modular top clamp within the channel (22) of the slot (14) of the body (12) for bonding without the need to measure or adjust the modular top clamp (30) on the body of the tool holder (10) of the tool (1). In accordance with an embodiment of the present invention, the modular top clamp (30) and the tool holder (10) body (12) each comprise features to repeatedly and consistently allow for the modular top clamp (30) to be fixedly secured onto the body (12) or within the channel (22) of the slot (14) of the body (12) of the tool holder (10). In accordance with an embodiment of the present invention, the modular top clamp (30) may be then bonded to the body (12) of the tool holder (10) by any suitable method of bonding known to those persons of ordinary skill in the art, for example, brazing, welding, adhesives, mechanical fasteners or the like for fixedly securing the modular top clamp (30) to the body (12) of the tool holder (10).

In certain embodiments of this invention, the modular top clamp (30) is made of a material that has a higher hardness than the material that the body (12) of the tool holder (10) is made of. For example, but not limited to, the modular top clamp (30) may be made of hardened steel and the body (12) of the tool holder (10) is made of steel. In certain embodiments of this invention, the modular top clamp (30) is made of carbide.

Figures 1, 2:
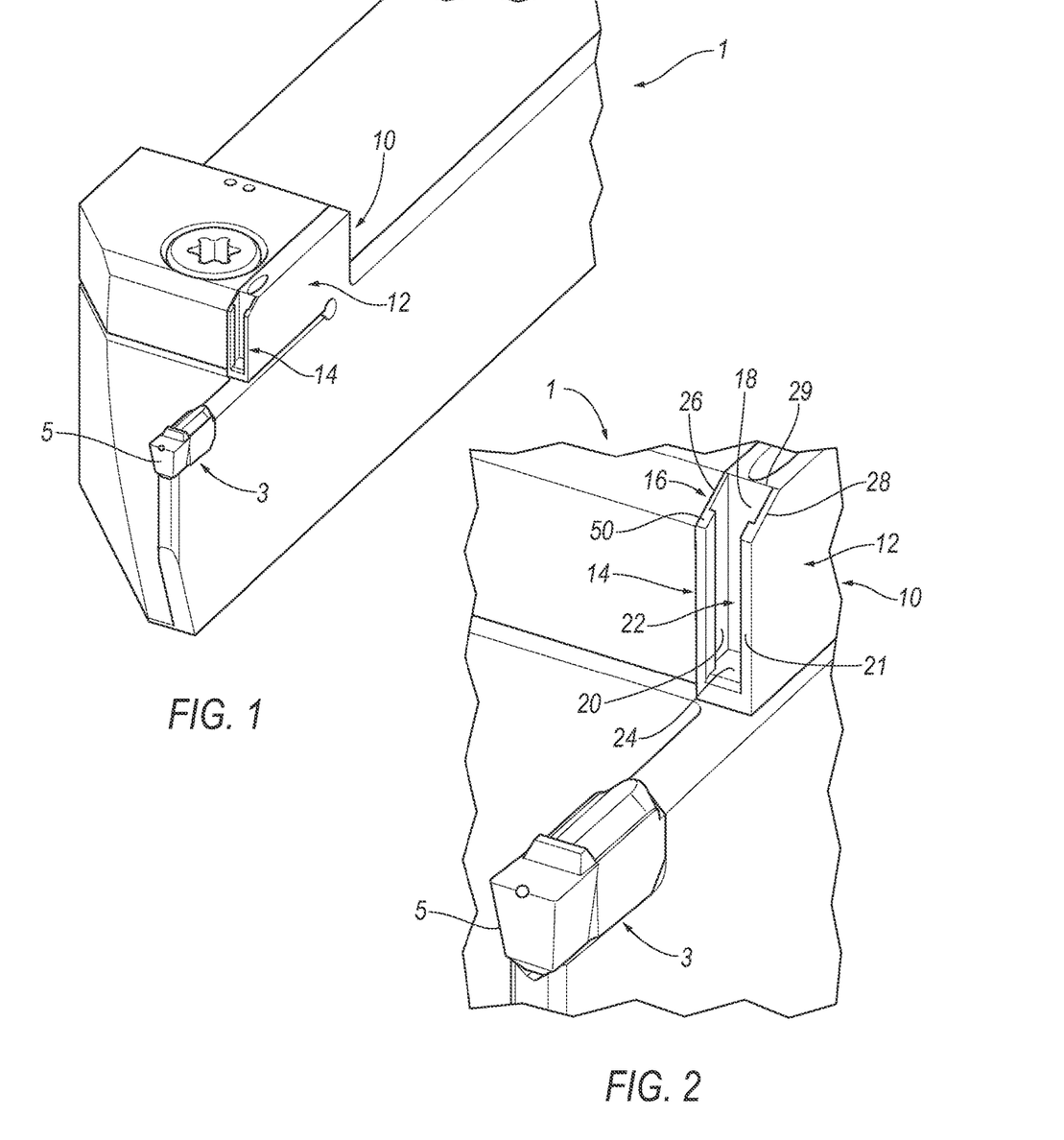
FIG. 1 shows an isometric view of the tool holder (10) of a grooving tool (1) of this invention.
FIG. 2 shows an isometric view of the tool holder (10) of this invention.
Figures 3, 4:
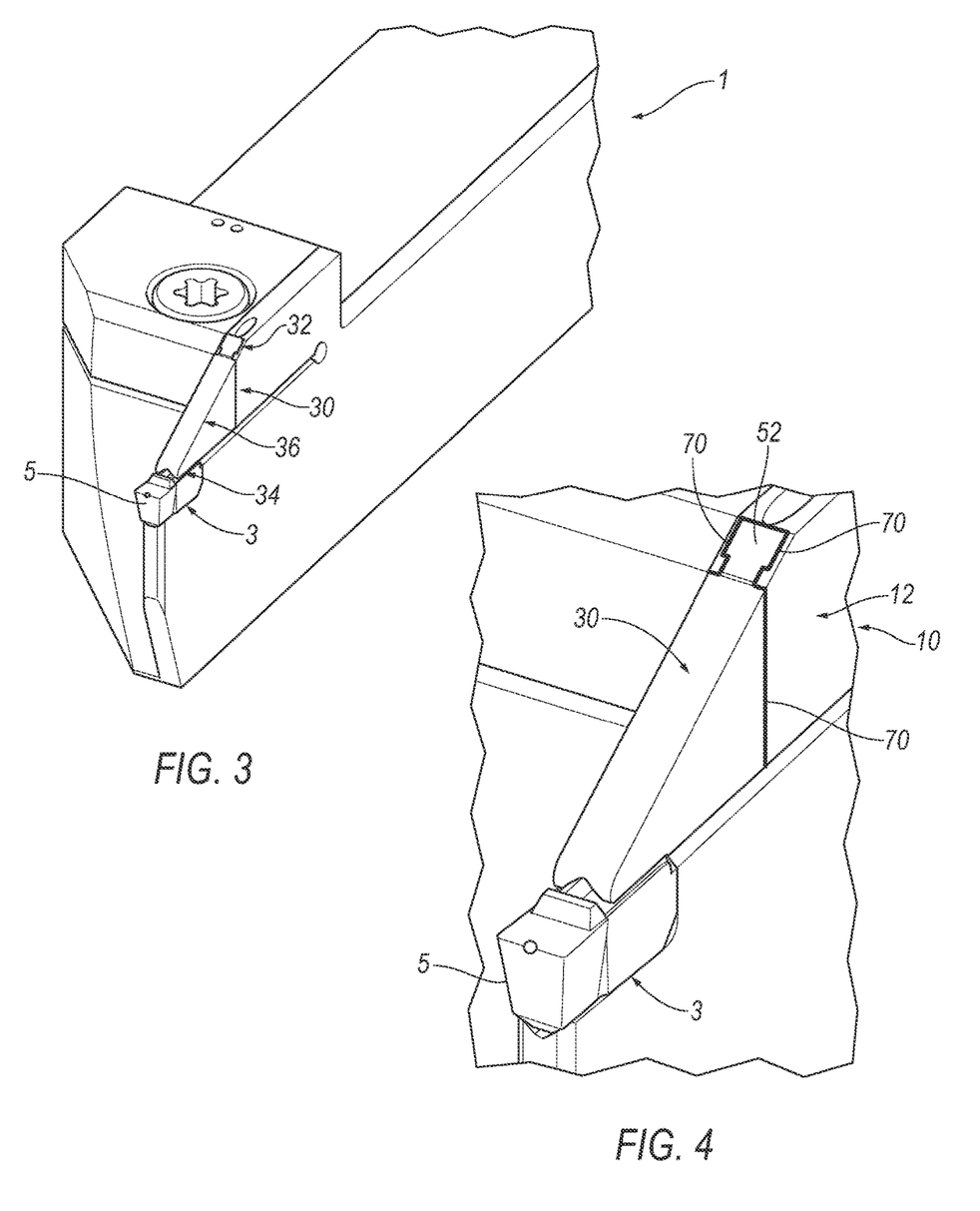
FIG. 3 shows an isometric view of the tool holder (10) and the modular top clamp (30) of a grooving tool of this invention.
FIG. 4 shows an isometric view of the tool holder (10) and the modular top clamp (30) of a grooving tool of this invention.
Figure 5:
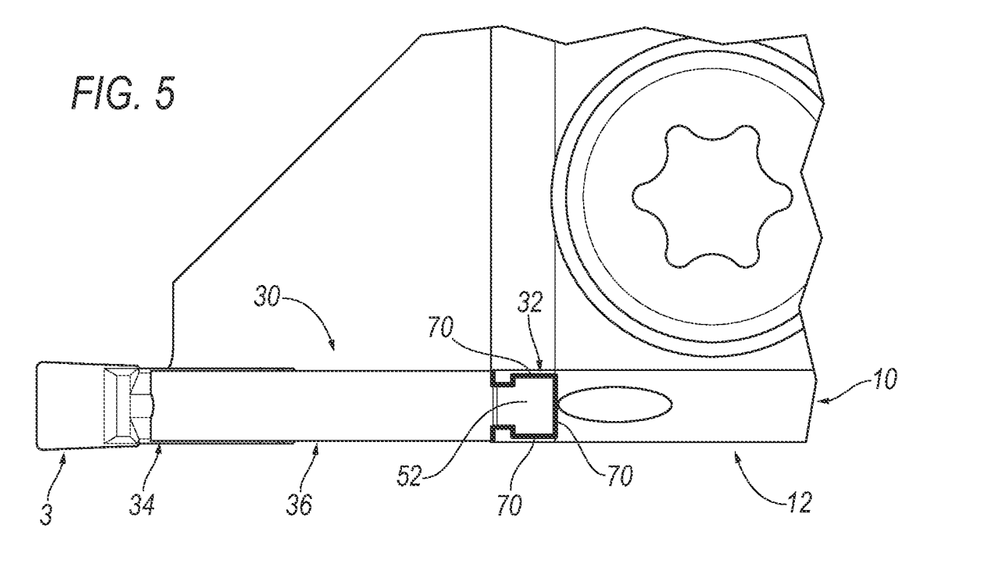
FIG. 5 shows a top view of the tool (1) and the "T" rail modular top clamp (30) of this invention.
Figure 6:
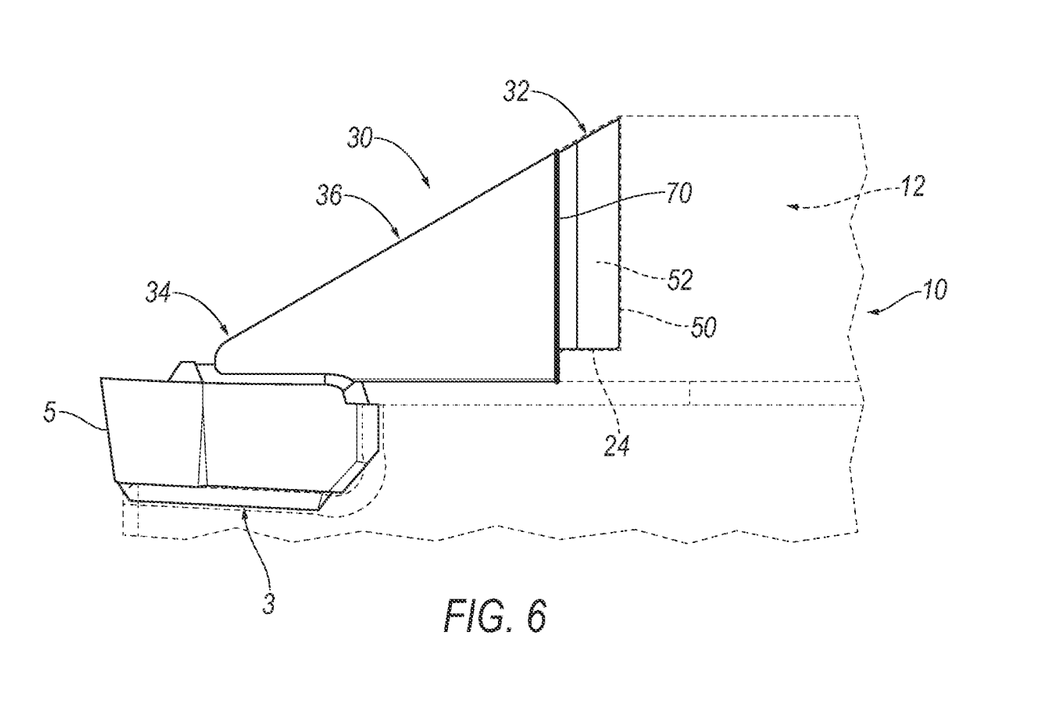
FIG. 6 shows a side view of the tool (1) and the "T" rail modular top clamp (30) of this invention.
Figure 7:
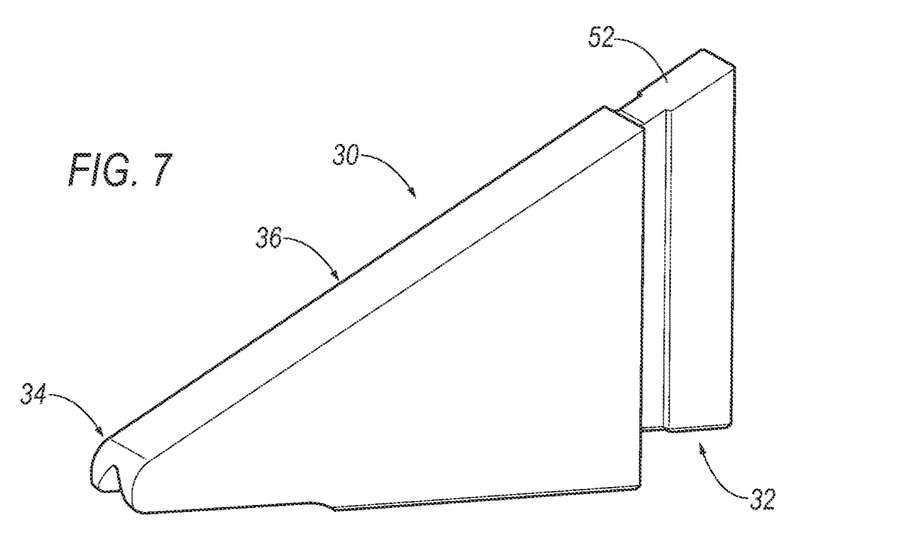
FIG. 7 show an isometric view of the "T" rail modular top clamp (30) of this invention.
Figures 8, 9:
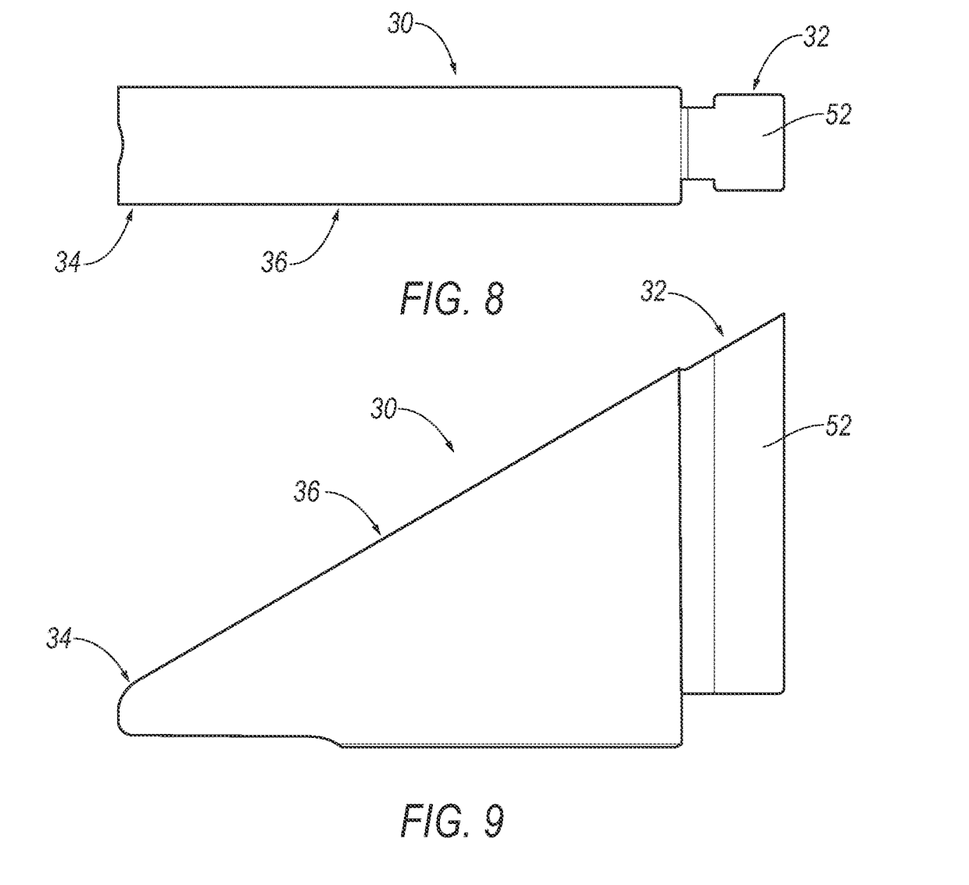
FIG. 8 shows a top view of the "T" rail modular top clamp (30) of this invention.
FIG. 9 shows a front view of the "T" rail modular top clamp (30) of this invention.

In certain embodiments of this invention, FIGS. 1-6 show that the slot (14) of the body (12) of the tool holder (10) is in the shape of a "T" slot (50), and wherein the first end (32) of the modular top clamp (30) is in the shape of a "T" rail (52). FIG. 6 shows the "T" rail modular top clamp (52) resting on the floor (24) of the body (12) of the tool holder (10). FIG. 7 shows an isometric view of the "T" rail modular top clamp (52). FIG. 8 shows a top view of the "T" rail modular top clamp (52). FIG. 9 shows a front view of the "T" rail modular top clamp (52).

Figure 10:
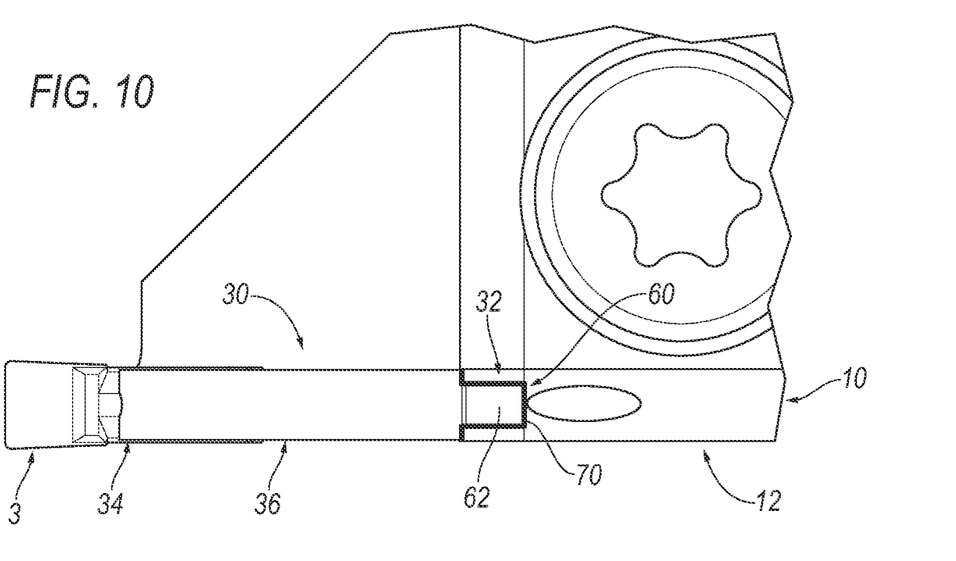
FIG. 10 shows a top view of the tool (1) and the "Rectangular" rail modular top clamp (30) of this invention.
Figure 11:
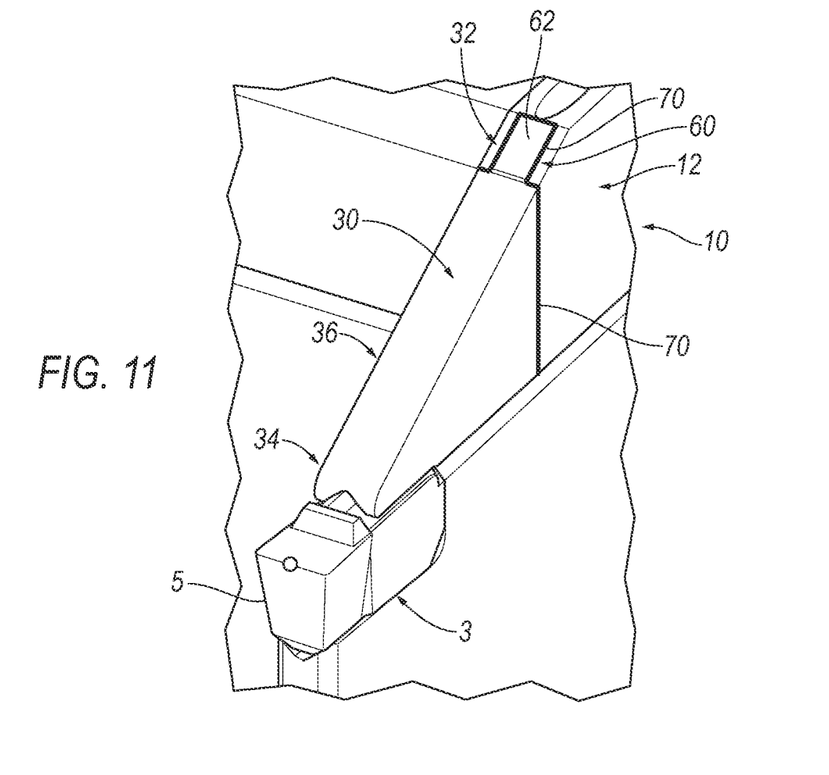
FIG. 11 shows an isometric view of the tool (1) and the "Rectangular" rail modular top clamp (30) of this invention.
Figure 12:
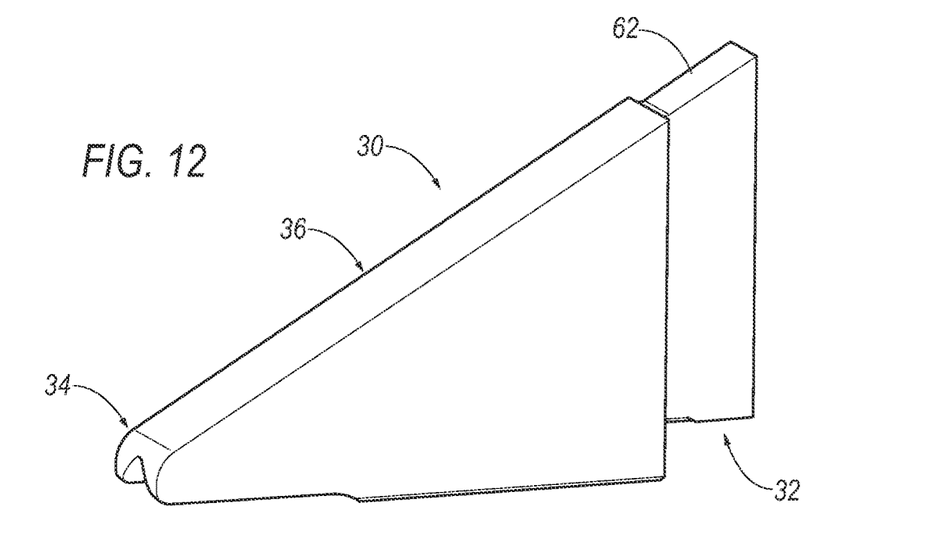
FIG. 12 shows an isometric view of the "Rectangular" rail modular top clamp (30) of this invention.
Figure 13:
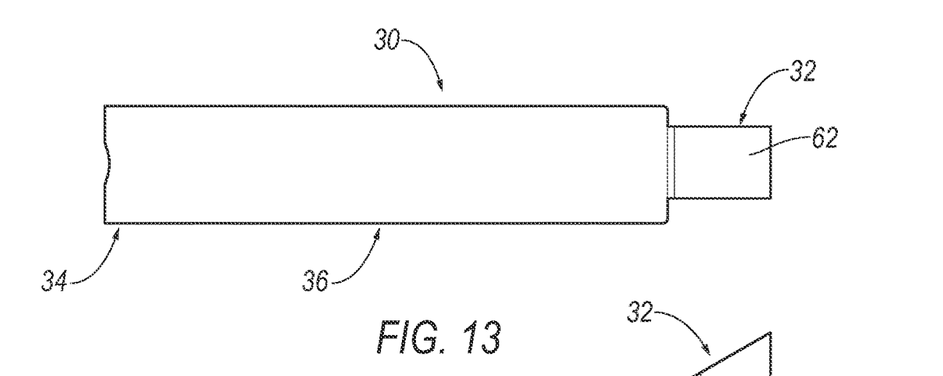
FIG. 13 shows a top view of the "Rectangular" rail modular top clamp (30) of this invention.
Figure 14:
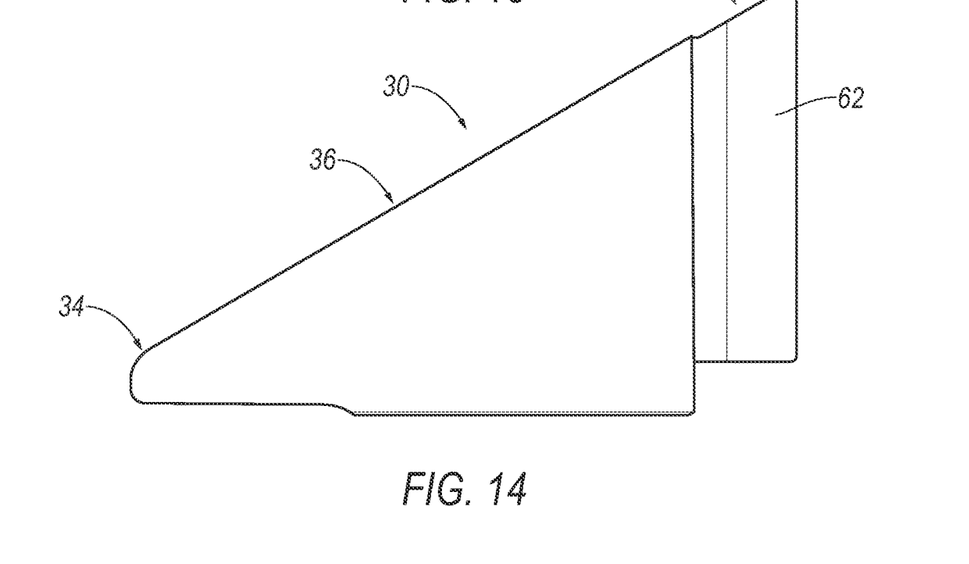
FIG. 14 shows a front view of the "Rectangular" rail modular top clamp (30) of this invention.
Figure 15:
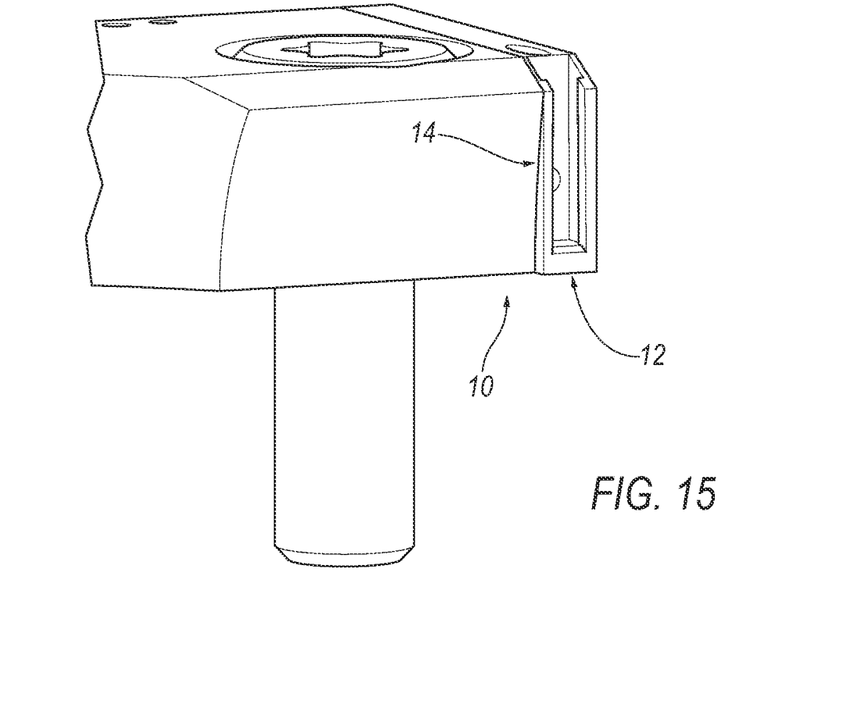
FIG. 15 shows an isometric view of the tool holder (10) having the body (12) and slot (14) of this invention with the bottom half removed.
Figure 16:
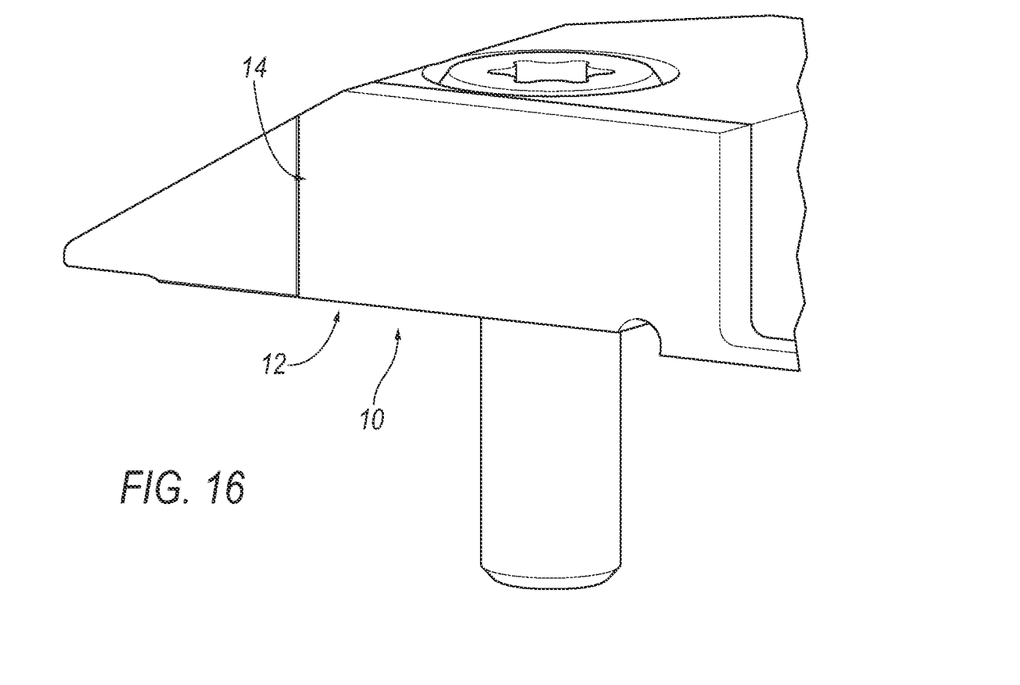
FIG. 16 shows an isometric view of the tool holder (10) having the body (12) and slot (14) of this invention with the bottom half removed.
Figure 17:
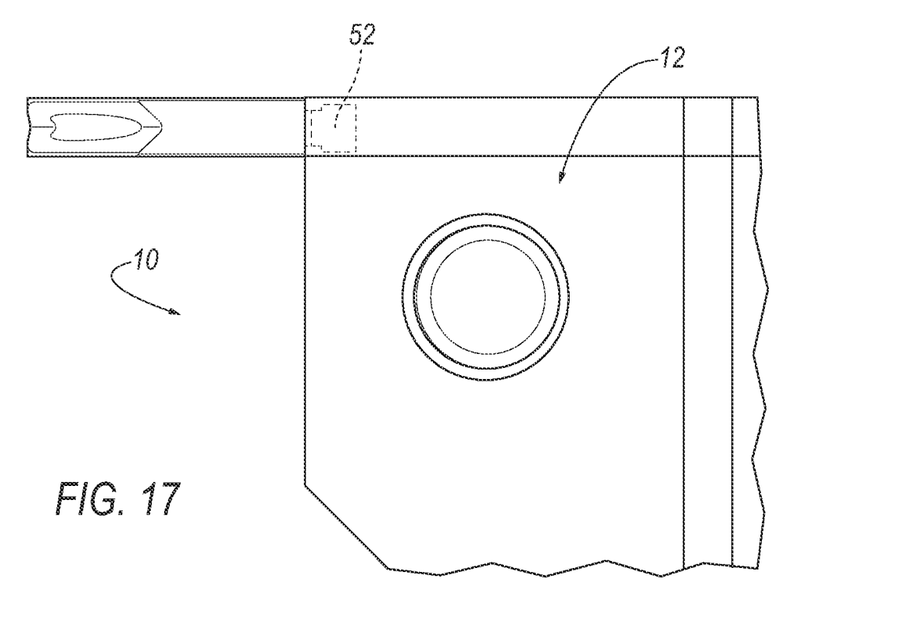
FIG. 17 shows a bottom view of the tool holder (10) of this invention without the cutting insert (5).
Figure 18:
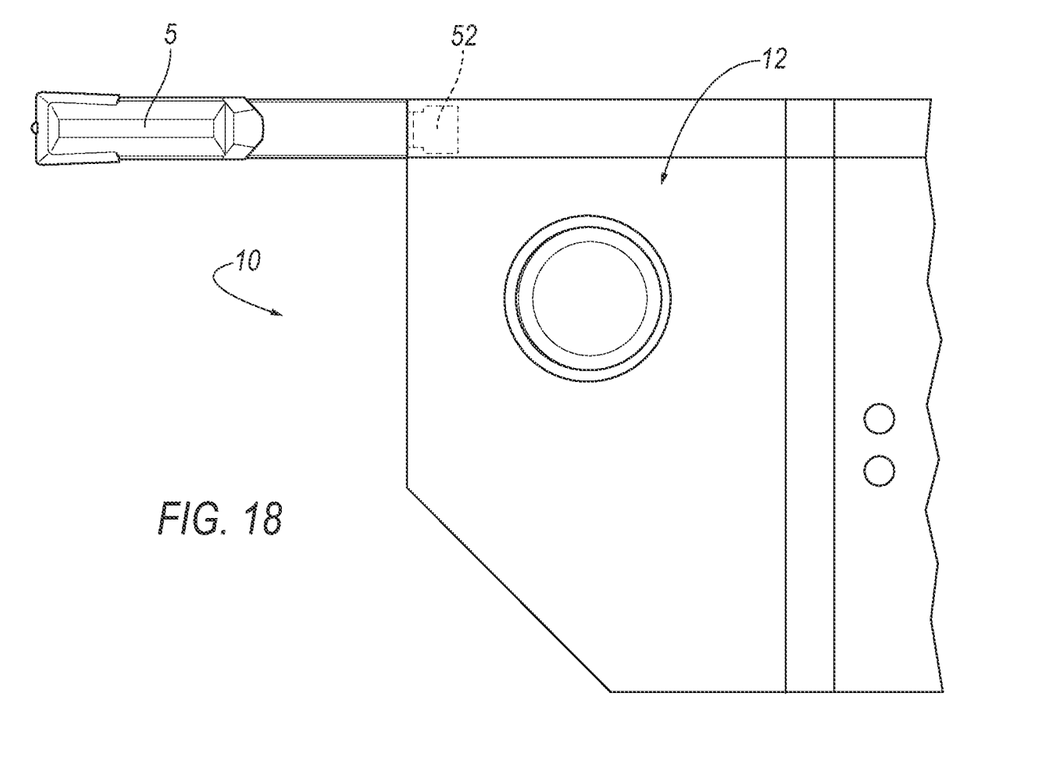
FIG. 18 shows a bottom view of the tool holder (10) of this invention with the cutting insert (5).

In certain embodiments of this invention, FIGS. 10 and 11 show that the slot (14) of the body (12) of the tool holder (10) is in the shape of a "rectangular" slot (60), and wherein the first end (32) of the modular top clamp (30) is in the shape of a "rectangular" rail (62). FIG. 11 shows the "rectangular" rail modular top clamp (62) resting on the floor (24) of the body (12) of the tool holder (10). FIG. 12 shows an isometric view of the "rectangular" rail modular top clamp (62). FIG. 13 shows a top view of the "rectangular" rail modular top clamp (62). FIG. 14 shows a front view of the "rectangular" rail modular top clamp (62).

Those persons of ordinary skill in the art understand that a top clamp of a grooving tool holder wears faster in deep grooving and low-pressure coolant applications due to continuous chip flow over the clamp. This invention is to improve the wear resistance by using a modular top clamp (30), preferably made of carbide. In a preferred embodiment of this invention, the carbide modular top clamp (52) has a "T-rail" shape, and the steel tool holder has a "T-slot" shape (50) for positioning of the "T-rail" shaped carbide modular top clamp (52). The "T-rail" shaped modular top clamp (52) is then attached, fixed, or brazed to the "T-slot" holder. (50).

It will be understood that the dimensions of the first end (32) of the modular top clamp (30) are smaller than the respective complementary dimensions of the slot (14) of the body (12) of the tool holder (10) in which the first end (32) of the modular top clamp (30) is positioned.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a", "an", and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A tool comprising:
    a tool holder having a body, wherein said body has a slot, and wherein said slot has (a) a top and wherein said top has an open end, and (b) an open front side;
    a modular top clamp that has a first end, a second end opposite said first end, and a middle section disposed between said first end and said second end; and
    a joining spacing;
    wherein said first end of said modular top clamp is positioned within said slot of said body of said tool holder wherein said joining spacing is located between at least a portion of said first end of said modular top clamp and at least a portion of said slot of said body of said tool holder; and
    wherein said joining spacing is a braze spacing, wherein said braze spacing is filled with a brazing material for bonding at least a portion of said first end of said modular top clamp to at least a portion of said slot of said body of said tool holder.

2. The tool of claim 1 wherein said modular top clamp is made of a material having a hardness that is greater than a hardness of a material that makes up said tool holder.

3. The tool of claim 2 wherein said modular top clamp is made of hardened steel and said tool holder is made of steel.

4. The tool of claim 2 wherein said modular top clamp is made of carbide.

5. The tool of claim 1 including a cutting body having a cutting insert.

6. The tool of claim 5 wherein said tool is a grooving tool.

7. The tool of claim 1 wherein said modular top clamp is in the shape of a "T" rail and wherein said slot of said body of said tool holder is in the shape of a "T" slot.

8. The tool of claim 7 wherein said modular top clamp is made of carbide.

9. The tool of claim 1 wherein said modular top clamp is in the form of a rectangular rail and wherein said slot of said body of said tool holder is in the form of a rectangular slot.

10. The tool of claim 9 wherein said modular top clamp is made of carbide.

11. A tool comprising:
    a tool holder having a body, wherein said body has a slot, wherein said slot has (a) a top wherein said top has an open end, and (b) an open front side that is perpendicular to said top of said slot, wherein said open front side of said slot is framed by a front face, a left side wall, a right side wall that is opposite to said left side wall, a back wall that is opposite to said open front side of said slot, and a floor that is opposite to said open end of said top of said slot, wherein said open front side of said slot, said left side wall of said slot, said right side wall of said slot, and said back wall of said slot form an open channel that extends in a longitudinal direction below said open end of said top of said slot of said body to said floor of said slot, and wherein said open channel is in communication with said open end of said top and said open front side of said slot;
    a modular top clamp that has a first end, a second end, and a middle section that is disposed between said first end and said second end of said modular top clamp, and wherein said first end of said modular top clamp is positioned within said open front side of said slot and said open channel of said slot; and
    a joining spacing disposed between at least a portion of said first end of said modular top clamp and a portion of said slot of said body; and
    wherein at least a portion of said first end of said first end of said modular top clamp and at least a portion of said slot of said body are bonded to fix said modular top clamp to said body of said tool holder, wherein said bonding occurs within at least a portion of said joining spacing.

12. The tool of claim 11 including a cutting body having a cutting insert.

13. The tool of claim 11 wherein said bonding is a brazing of at least a portion of said first end of said modular top clamp to fix at least a portion of said first end of said modular top clamp to at least a portion of said body of said tool holder.

14. The tool of claim 13 wherein at least a portion of said first end of said modular top clamp is brazed to fix at least a portion of said first end of said modular top clamp to at least a portion of said body of said tool holder along one or more of said top of said slot, the left side wall of said slot, the right side wall of said slot, the back wall of said slot, the floor of said slot, and the face of the open front side of the body, with a braze material filling in said joining spacing to form a bonding layer.

15. The tool of claim 14 wherein said braze material is a silver-based alloy, and the modular top clamp is made of carbide.

16. The tool of claim 11 wherein said modular top clamp is in the shape of a "T" rail and wherein said slot of said body of said tool holder is in the shape of a "T" slot.

17. The tool of claim 11 wherein said modular top clamp is in the form of a rectangular rail and wherein said slot of said body of said tool holder is in the form of a rectangular slot.

\* \* \* \* \*